3,267,006
PANCREATIC COLLAGENASE AND PREPARATION OF SAME

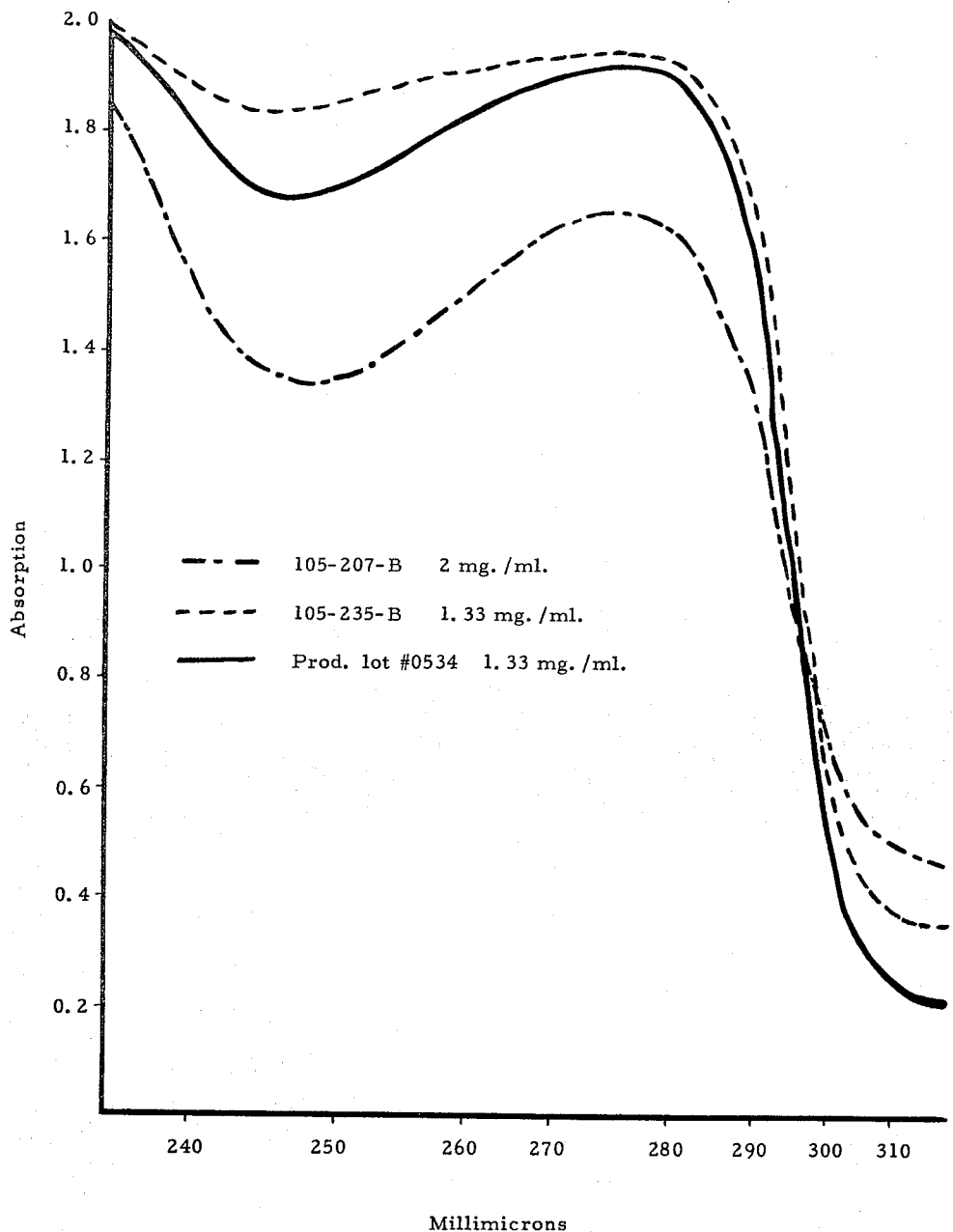

Anwar A. Hakim, Kankakee, and Richard L. Peters, Chebanse, Ill., assignors to Armour Pharmaceutical Company, Chicago, Ill., a corporation of Delaware
Filed Apr. 20, 1962, Ser. No. 189,672
8 Claims. (Cl. 195—62)

This invention relates to enzyme treatment and also to the preparation of pancreatic collagenase. More particularly, the invention is directed to the treatment of humans and animals for the alleviation of physical disorders such as inflammatory conditions, etc., by the administration of collagenase and elastase.

We have discovered that the administration of these specific enzymes, elastase and pancreatic collagenase, is effective in the treatment of certain disorders such as inflammatory conditions, in ulcerous conditions, and in wound healing after surgery. We have further discovered that it is possible to prepare collagease from mammalian tissues and that pancreatic collagenase, when administered parenterally, is unusually effective in the treatment of collagenous diseases, and particularly those clinical conditions which require an increased rate of collagen turnover.

A primary object of the invention, therefore, is to provide for alleviating pathological conditions such as, for example, inflammatory conditions, through the administration of the enzymes elastase and collagenase. A further object is to provide for such treatment with collagenase isolated from mammalian tissues. Yet another object is to provide a method of preparing collagenase from mammalian tissues which is completely soluble in aqueous solutions. A further object is to provide a method for the large scale production from pancreas tissue of a collagenase of very low toxicity, and of a purity suitable for parenteral administration. Other specific objects and advantages will appear as the specification proceeds.

We have discovered that collagenase and elastase, unlike other enzymes, produce specific action on the hexosamine and dialyzable peptides and amino acids pool, when administered parenterally, and apparently catalyze certain specific processes needed for the sequence of events by which connective tissue is formed. Both collagenase and elastase influence the blood (plasma and serum) hexosamine concentration. Treatment with either enzyme results in noticeable decrease of the blood hexosamine and influences both the carbohydrate and peptide pool. The removal (utilization) of available hexosamine, with the decrease in the dialyzable peptide and amino acids, enable these enzymes to be used effectively in protein and mucoprotein synthesis.

The enzymes may be prepared in any suitable manner. Elastase is an elastolytic enzyme and is available as a product obtained from the pancreas. It affects the elasticity of the walls in blood vessels and skin. For administration it may be dissolved in pyrogen-free distilled water, filtered, and a 2% solution prepared. Intravenous injection of elastase at 20 mg. level, similar to collagenase, results in no noticeable discomfort or in any abnormal behavior of an animal. The animals remain calm and obedient.

The hexosamine concentration of plasma and serum prepared from blood of elastase treated animals, obtained by cardiac catheterization, diminished by 15.78 and 46.80% seventy-five minutes after the administration of the enzyme. The fall in the hexosamine level diminishes progressively, and 24 hours after administration of elastase the values were 9.12 and 26.06% lower than the values of plasma and serum at zero time (before injecting the elastase).

The dialyzable peptides and amino acids from the plasma and serum of elastase treated animals, calculated as mg. of protein per ml. of plasma or serum, showed minor inconsistent variation.

After resolution on paper chromatography, the ninhydrin reacting peptides and amino acids of serum from the elastase treated animals increased progressively. During the first fifteen minutes after administration of elastase, the dialyzable ninhydrin peptides and amino acids level of the serum diminished by 49% of the original value before injection. Twenty-four hours after injection, the level has increased by 8% higher than the zero time level. In the plasma, the decrease in the dialyzable, ninhydrin peptides and amino acids continued for the first 75 minutes, then the level increased up to 34% higher than the normal value six hours after the injection and attained the normal value 24 hours after adiministration of the enzyme.

Collagenase is a proteolytic mucolytic enzyme. Heretofore it has been produced from a bacterial source, being elaborated by *Clostridium histolyticum*. We have discovered that collagenase may also be isolated effectively from mammalian tissue and that such isolated pancreatic collagenase is much more effective than the bacterial collagenase and has certain properties which will be described more in detail hereinafter. Our discovery, therefore, is not only that collagenase, however prepared and from whatever source, when purified sufficiently for administration, is effective for relieving collagenous diseases, inflammatory conditions, ulcerous conditions, and for wound healing after surgery, but also that pancreatic collagenase can be prepared from mammalian tissue in relatively pure enzme form suitable for parenteral administration.

Pancreatic collagenase may be prepared by extracting defatted animal pancreas material with saline solution, adsorbing the collagenase in the solution extract onto an absorption agent, and eluting the adsorbed material. For example, pancreatic collagenase may be prepared from defatted animal pancreas powder, the enzyme being extracted from the defatted pancreas powder with normal saline and further purified by ammonium sulfate fractionation and adsorption on calcium phosphate gel. The enzyme may then be eluted with 10% ammonium sulfate, dialyzed and lyophilized. The product thus obtained is a white powder with a faint grayish tinge, and is completely soluble in aqueous solutions.

As a specific example, fresh porcine pancreas packed in Dry Ice was used as the starting material. The glands and the Dry Ice were ground to fine powder and the Dry Ice was allowed to evaporate at 0° C. The powder was defatted by successive extraction with alcohol-Skelly B (3:1) and by acetone.

The defatted pancreas powder was extracted with normal saline and the aqueous extract was fractionated with ammonium sulfate. The precipitate obtained by 60% saturation of ammonium sulfate was dissolved in distilled water and added slowly to calcium phosphate gel in 0.005 M phosphate buffer at pH 7.6. The mixture was stirred for three hours at 25° C. and filtered. The residue from the filtration was washed thoroughly with 0.005 M phosphate buffer. The collagenase was eluted from the washed residue by 10% ammonium sulfate, dialyzed exhaustively against large volumes of distilled water, and lyophilized to dryness.

The chemical and physical characterization of pancreatic collagenase—Table I[1] shows the total nitrogen and non-protein nitrogen content of two batches of collagenase. The ultraviolet spectrum of pancreatic collagenase as shown in the figure shows that maximum absorption is at wavelength 275 and the minimum is at wavelength 248.

TABLE I[1]

|  | Lot number | |
| --- | --- | --- |
|  | 105-235-B | 0534-P$_1$ |
| Total N, mg./gm | 105.23 | 73.9 |
| NPN, mg./gm | 15.20 | 7.07 |
| Maximum (u.v.) | 275 | 275 |
| Minimum (u.v.) | 248 | 248 |

[1] Pancreatic collagenase after resolution on paper electrophoresis in 0.005M phosphate buffer, pH 7.5.
The enzyme is located by staining the electrograms with bromephenol blue.

*Procedures used in determining the action of pancreatic collagenase in vivo*

(a) Histamine determination was as follows:

The following reagent solutions were prepared freshly before use: 4% sodium nitrite in distilled water, 2% P-bromoaniline in 4% HCl, 21.4% sodium carbonate and veronal buffer of pH 7.7 (consisting of 9.2 grams of diethyl barbituric acid, 2 grams of sodium hydroxide, dissolved in 1 liter of distilled water and the pH is adjusted to 7.7 with 1 N acetic acid).

A working solution consisting of 5 ml. of the sodium nitrite solution and 5 ml. of the P-bromoaniline solution was mixed, and n-butanol was added to make a total volume of 100 ml. The mixture was shaken and the butanol layer was allowed to separate to be used in the test.

A 0.9 μM histamine diphosphate in 4% HCl or 10% trichloroacetic acid (TCA) was used as the starting stock solution.

The histamine diphosphate stock solution was diluted in such a way as to get solutions containing 2.5 to 25.0 micrograms per milliliter.

To 1 ml. of the test sample, 1 ml. of the sodium nitrite-P-bromoaniline working solution and 0.5 ml. of the sodium carbonate solution were added, mixed thoroughly and incubated at 50° C. for 4 minutes, then cooled to 2° C. With a cannula attached to a 5 ml. syringe, the aqueous phase was pipetted out and discarded. To the organic layer 2 ml. of the veronal buffer were added (to give a pH of 7.7), thoroughly mixed and allowed to settle at 2° C. for 60 minutes. The aqueous layer was pipetted out and discarded. The organic layer was diluted with 1 ml. of n-butanol after the optical density was determined at a wavelength of 525 mμ. Three drops of glacial acetic acid were added to bring the pH to 3.0 and the optical density was re-estimated.

A blank solution was prepared using 1 ml. of 4% HCl treated as described above.

The difference between the reading at pH 7.7 and pH 3.0 was plotted against micrograms of histamine diphosphate.

(b) Collagenase activity in vitro:

In all instances the activity of the enzyme was determined on collagen as substrate by measuring the liberated amino groups with the use of the ninhydrin procedure after resolution on paper chromatograms and with the use of a Beckman spectrophotometer.

(c) Hexosamine determination:

The hexosamine method described by Boas in N.F., Journal Biol. Chem. 204, 553 (1953), was used with minor modifications. The method depends on condensation reaction with acetyl acetone and Ehrlich's reagent.

(d) Resolution of dialyzable peptides and amino acids:

Resolution of the blood (serum or plasma) dialyzable peptides and amino acid, or the amino acids (proline or hydroxyproline) from the incubation mixture of collagenase with collagen, was carried out on Whatman No. 1 filter paper. The resolution was carried separately by two solvent systems: the butanol-acetic acid-water (4:1:5) and the isopropanol-ammonium hydroxide-water (80:15:5 v./v.). The latter solvent system was allowed to flow for 48 hours, where good resolution of proline and hydroxyproline was attained. After chromatography was completed, the chromatograms were dried and treated with ninhydrin solution (0.5% ninhydrin in acetone). The papers were allowed to dry at room temperature. The intensity of the ninhydrin stained components was obtained by passing the chromatograms through Spinco Analytrol with filter No. 550 for the peptides and amino acids, and filter No. 500 for proline and hydroxyproline.

(e) Action of pancreatic collagenase in skin transplantation and in wound healing:

Skin from the backs of 5 rats (donors) was transplanted into 20 rats. Male donors gave to male recipients and female donors gave to female recipients. The backs of all the rats were well shaven and sterilized before operation. Strict aseptic conditions were used through the transplantation procedure. The recipient rats were divided into four groups: female controls, female collagenase treated, male controls and male collagenase treated. Transplantation was carried out on a Friday; treatment was done by subcutaneous injection of collagenase (1 ml. of 1% solution in sterile normal saline). The animals were sacrificed on the following Monday. The grafts were weighed before transplantation and after removal from the recipient animals. An accurately weighed portion of the skin adjacent to the wound was removed. Hexasamine concentration was determined on both the skin and the graft. The characteristic of the graft and wound was noted qualitatively. Wherever bacterial infection occurred, it was noted and the whole animal was discarded.

The skin surrounding the wound and the grafts were weighed and pooled as two groups. These tissues were then minced with scissors. 20 milliliters of 2 N HCl were added per gram of tissue and hydrolysis was allowed for 16 hours at 95° C. The hydrolysate was filtered and an aliquot was used for the hexosamine determination.

(f) Action of pancreatic collagenase in artificial inflammation:

Thirty mg. of membutal per kilogram body weight administered intraperitoneally were used to anesthetize the rats. Then the backs were clipped clean of hair and 25 ml. of sterile air was forced under the skin. A 0.5 ml. of 1% croton oil in corn oil was then injected into the air pouch. At 48 hours the air was aspirated and at 192 hours the rats were bled by heart puncture for plasma and serum. While the animals were under deep ether anesthesia, the exudate of the pouch was collected and measured, using a 10 ml. syringe.

Each experiment contained six groups of rats, 10 rats per group, divided into such groups to contain one group treated with normal saline (the control group), a second group treated with hydrocortisone (the anti-inflammatory action group), and the four remaining groups treated with the test material.

Treatment was started directly after the introduction of the air pouch and continued by daily subcutaneous injections. In these studies the assay was started on a Monday and treatment was continued to cover the whole week until the following Monday when the animals were bled.

*Results*

Pancreatic collagenase, an endolytic enzyme, was prepared from defatted porcine pancreas powder. The enzyme was extracted from the defatted pancreas powder with normal saline and further purified by ammonium sulfate fractionation and adsorption on calcium phosphate gel. The enzyme was then eluted with 10% ammonium sulfate, dialyzed and lyophilized. The product thus obtained was a white powder with a faint grayish tinge, and was completely soluble in aqueous solutions.

The action of this pancreatic collagenase was compared with the action of a bacterial collagenase (obtained from Nutritional Biochemical Corporation) on three different batches of collagen. The results are presented in the upper section of Table I. The data indicate difference in collagenase activity on different collagen preparations.

Analysis of the data in the lower section of Table I indicates that pancreatic collagenase before adsorption on calcium phosphate gel did not act on ATEE or on BAEE indicating absence of any chymotryptic or tryptic activities. After adsorption of calcium phosphate gel followed by elution and dialysis, there was very weak activity on ATEE and on BAEE. Activation of pancreatic collagenase (by the addition of trypsin and $Ca^{++}$) failed to increase the chymotryptic activity on ATEE.

Intravenous injection of a bacterial collagenase (Lot NBC) caused noticeable decrease in the blood hexasamine level (15.4, 25.4 and 36.6 percent at 15, 75 and 360 minutes after injection). Pancreatic collagenase decreased the serum and plasma hexosamine by 21.3 and 24.8%, respectively. Intravenous injection of pancreatic collagenase in the animal increased considerably the plasma and serum level of histamine (see Table II).

After intravenous injection of the bacterial collagenase (Lot NBC), the dialyzable peptides and amino acids, calculated from the optical densities at 260 and 286 m$\mu$, showed minor inconsistent variation. On the other hand, when pancreatic collagenase was injected intravenously, the dialyzable peptides and amino acids increased by 250% during the first 15 minutes, then started to decrease progressively.

The dialyzable peptides and amino acids as obtained after resolution on paper chromatography tend to increase by 198.4 and 178.1% in the plasma and serum respectively (see Table III).

TABLE I.—PANCREATIC COLLAGENASE ENZYMIC ACTIVITIES

[A. On Collagen]

| Substrate | Pancreatic Collagenase, CU/mg. | Bacterial Collagenase, CU/mg. |
|---|---|---|
| Collagen (NBC) | 320 | 220 |
| Collagen (1018-147-ST) | 640 | 30 |
| Collagen (1018-147-BC) | 510 | 660 |

[B. On Hemoglobin and Synthetic Substrate]

| Substrate | Extract B, AU/mg. | Pancreatic Collagenase, AU/mg. |
|---|---|---|
| ATEE | Nil | 40 |
| BAEE | Nil | 7 |
| Hemoglobin | 4.36 | 70 |

Extract B is the 50% precipitate reconstituted in distilled water, dialyzed and lyophilized. It is the stage before adsorption on calcium phosphate gel.
Pancreatic Collagenase contains around 35% NPN, which is probably ammonium sulfate.

TABLE II.—ACTION OF PANCREATIC COLLAGENASE IN NORMAL RABBITS

[Treatment was carried out as one single intravenous injection (1 ml. of 20% collagenase solution in sterile normal saline). Blood samples are withdrawn at the time intervals indicated in the table]

| Time, Minutes | Hexosamine | | | Histamine | | |
|---|---|---|---|---|---|---|
| | Serum, Percent | Plasma, Percent | Total, Percent | Serum, Percent | Plasma, Percent | Total, Percent |
| 0 | | | | | | |
| 15 | +16.9 | −19.5 | 0 | +27.1 | −0.8 | +8.4 |
| 75 | −10.3 | −23.6 | −16.8 | +17.4 | +79.0 | +48.5 |
| 300 | −21.3 | −24.8 | −23.0 | +80.5 | +81.9 | +81.4 |

TABLE III.—ACTION OF PANCREATIC COLLAGENASE IN NORMAL RABBITS

[The dialyzable peptides and amino acids of serum and plasma from blood obtained by cardiac catheterization]

| Times, Minutes | By the Beckman Spectrophotometer at 260 and 280 m$\mu$ | | | By the Spinco Analytrol after resolution on paper chromatography | | |
|---|---|---|---|---|---|---|
| | Serum, Percent | Plasma, Percent | Total, Percent | Serum, Percent | Plasma, Percent | Total, Percent |
| 0 | | | | | | |
| 15 | +195 | +350 | +250 | +22.3 | +70.5 | +46.2 |
| 90 | −86 | +420 | +97 | −13.4 | +75.6 | +30.6 |
| 300 | +4.8 | +83 | +33 | +178.1 | +198.4 | +188.1 |

Pancreatic collagenase, when injected subcutaneously into normal rats, influenced the blood hexosamine differentially. While the serum hexosamine level increased, the plasma hexosamine level tended to decrease. The influence appeared to be complex in nature and dose level dependent. The total blood hexosamine level increased by 19.8% when 1 mg. of pancreatic collagenase was administered subcutaneously, but when 12 mg. of the enzyme were administered, the total blood hexosamine showed no change. On the other hand, when hydrocortisone was administered subcutaneously at 6 mg. dose level, it increased the total blood hexosamine level by 30%.

Subcutaneous injection of pancreatic collagenase decreased the blood (serum and plasma) histamine level at all dose levels (from 1 to 12 mg.) except at 3 mg./kg. dose level the blood (only serum) histamine level increased (see Table IV).

Pancreatic collagenase, when injected subcutaneously into rats with granuloma pouch influenced the blood hexosamine differentially while the serum hexosamine level increased and the plasma hexosamine level tended to decrease. The influence varied with the dose injected and is complex in nature. The effect was comparable with that obtained in normal rats. The increases in the rats with granuloma pouch were approximately one-third those obtained in normal rats. Hydrocortisone, when injected subcutaneously to rats with granuloma pouch, also produced an increase equivalent to one-third that obtained in normal animals (compare Tables IV and V).

Subcutaneous injection of pancreatic collagenase into rats with granuloma pouch decreased the blood histamine at dose levels 6 and 12 mg./kg. At dose levels 1 and 3 mg./kg., pancreatic collagenase increased the blood histamine level.

Subcutaneous injection of hydrocortisone into rats with granuloma pouch increased the blood (serum and plasma) histamine, an effect opposite to that obtained when hydrocortisone was injected into normal rats.

Subcutaneous injection of pancreatic collagenase, although increasing the dialyzable peptides and amino acids (calculated from the spectrophotometric data at 260 and 280 m$\mu$) of the blood, decreased the ninhydrin positive dialyzable peptides and amino acids after resolution on paper chromatography (see Table VI).

TABLE IV.—ACTION OF PANCREATIC COLLAGENASE IN NORMAL RATS

[Treatment was carried out by subcutaneous injection at the daily doses as shown in the table for eight consecutive days]

| Dose, mg./kg. | Hexosamine | | | Histamine | | |
|---|---|---|---|---|---|---|
| | Serum, Percent | Plasma, Percent | Total, Percent | Serum, Percent | Plasma, Percent | Total, Percent |
| 1 | +55.8 | −13.3 | +19.8 | 0.0 | −35.7 | −16.1 |
| 3 | +19.7 | −1.2 | +8.8 | +39.0 | −13.5 | +28.8 |
| 6 | +32.5 | −24.6 | +1.6 | −8.7 | −35.7 | −20.9 |
| 12 | +14.3 | −13.3 | 0 | −10.8 | −58.2 | −32.1 |
| Hydrocortisone | +51.5 | +10.1 | +30.0 | −21.0 | −100 | −56.5 |

Hydrocortisone dose was 6 mg./kg. body weight.

TABLE V.—ACTION OF PANCREATIC COLLAGENASE IN RATS WITH GRANULOMA POUCH

[Treatment was carried out by subcutaneous injections at the daily dose levels as shown in the table for eight consecutive days]

| Dose, mg./kg. | Hexosamine | | | Histamine | | |
|---|---|---|---|---|---|---|
| | Serum, Percent | Plasma, Percent | Total, Percent | Serum, Percent | Plasma, Percent | Total, Percent |
| 1 | +14.5 | −4.2 | +6.4 | +1.5 | +12.2 | +6.6 |
| 3 | +13.4 | −10.8 | +1.2 | +21.3 | +23.5 | +22.4 |
| 6 | +28.8 | −2.4 | +13.1 | −7.4 | +0.9 | −3.6 |
| 12 | +6.1 | −5.4 | 0 | +0.7 | −6.7 | −2.7 |
| Hydrocortisone | +10.4 | +12.0 | +11.2 | +30.0 | +38.0 | +33.9 |

Hydrocortisone dose was 6 mg./kg. body weight.

TABLE VI.—ACTION OF PANCREATIC COLLAGENASE IN RATS WITH WITH GRANULOMA POUCH

[The dialyzable peptides and amino acids of serum and plasma from blood obtained by heart puncture of rats with granuloma pouch]

| Dose, mg./kg. | By the Beckman Spectrophotometer at 260 and 280 m$\mu$ | | | By the Spinco Analytrol after resolution on paper Chromatography | | |
|---|---|---|---|---|---|---|
| | Serum, Percent | Plasma,[1] Percent | Total, Percent | Serum, Percent | Plasma, Percent | Total, Percent |
| 0 | | | | | | |
| 1 | +31 | +106 | +69 | −5.8 | +5.4 | −1.4 |
| 3 | −44 | +72 | +14 | −21.1 | −20.9 | −21.0 |
| 6 | +106 | +44 | +75 | −29.4 | +8.1 | −14.6 |
| 12 | +50 | +131 | +90 | −32.3 | +9.1 | −23.2 |
| Hydrocortisone (6) | ([2]) | +116 | ([2]) | 0 | +26.3 | −10.3 |

[1] During dialysis some leakage through the dialysis tube was noted while dialyzing the control plasma, thus the plasma values were calculated from the values obtained for the control serum.
[2] Hydrocortisone sera also showed some leakage through the dialysis tubes.

It was further found that in male rats, subcutaneous injection of pancreatic collagenase increased the hexosamine content of graft and wound tissues by 13.8 and 14.0%, respectively. In female rats, pancreatic collagenase increased the hexosamine content of the wound tissue by 6.4% and decreased slightly the graft hexosamine content by 1.2%. In male rats, subcutaneous injection of bacterial collagenase increased the hexosamine content of the wound tissue 2.8% and did not change the hexosamine content of the graft except by 0.7%. In female rats, the subcutaneous injection of a bacterial collagenase didn't change the hexosamine content of the wound tissue but increased the hexosamine content of the graft by 5.0%. In both sexes, the subcutaneous injection of pancreatic collagenase accelerated the condition of the graft and increased noticeably vascularization of the grafts.

ACTION OF COLLAGENASE ON RAT SKIN AND RAT SKIN GRAFTS

| | Pancreatic Collagenase, Percent | Bacterial Collagenase (NBC), Percent |
|---|---|---|
| Male Rat Wound [1] | +14.0 | +2.8 |
| Female Rat Wound [1] | +6.4 | −0.1 |
| Male Rate Grafts | +13.8 | −0.7 |
| Female Rat Grafts | −1.2 | +5.0 |

[1] The "wound" indicates the skin taken adjacent the wound.

The action of pancreatic collagenase on the inflammatory condition produced by the granuloma pouch technique was estimated by measuring the volume of the exudate into the pouch. At the same time, the hexosamine content of the exudate was measured. The subcutaneous injection of pancreatic collagenase into rats with granuloma pouch caused a progressive decrease in the volume of the exudate with increasing doses of the enzyme. Subcutaneous injection of 1 and 16 mg./kg. body weight per day for eight consecutive days decreased the volume of the exudate by 23.1 and 71.1%, respectively. Under similar conditions, subcutaneous injection of hydrocortisone (6 mg./kg. body weight per dose) decreased the volume of exudate by 76.1%.

The hexosamine content of the exudate increased slightly (6.8%) with 1 mg./kg. dose, and decreased by 25% with 3 and 8 mg./kg. doses of pancreatic collagenase. The dose level of 16 mg./kg. of the enzyme did not change the hexosamine content of the exudate. On the other hand, subcutaneous injection of hydrocortisone (6 mg./kg./dose) decreased the hexosamine content of the exudate by 37.9%. The data indicate that although the volume of the exudate varied inversely with the subcutaneous dose of pancreatic collagenase, the hexosamine content per milligram of dried exudate lacked this response. Because of the large amounts of enzyme needed for these studies, no attempts were made to use bacterial collagenase.

From preliminary experiments, subcutaneous injection of 2.4 and 9.6 mg. of bacterial collagenase per kilogram body weight per day for five consecutive days decreased the volume of the pouch exudate by 20.8 and 38.2%, respectively.

Pancreatic collagenase similar to most other foreign proteins induced histamine release when injected intravenously. It is interesting to note that pancreatic collagenase, when injected subcutaneously at various doses, decreased the blood histamine level except at the 3 mg./kg. body weight per day level. The increase in the blood histamine level induced by the 3 mg./kg. level, might indicate that pancreatic collagenase action is immunologically different from the action of enzyme at higher dose levels.

The data reported indicate quantitative differences between the dialyzable peptides and amino acids measured by the two procedures of analyses (the spectrophotometric procedure utilizing the ultra-violet absorption at the wavelengths 260 and 280 m$\mu$, and the ninhydrin staining procedure after resolution on paper chromatography). These differences could be due to the fact that proline and hydroxy-proline peptides are amino acids liberated by the action of pancreatic collagenase in vivo, although they absorbed ultra-violet light at 260 and 280 m$\mu$, they stained very faintly with ninhydrin. Therefore, the difference between the spectrophotometric data and the analytrol could indicate strong enzyme specific activity in vivo.

Intravenous injection of a single dose of pancreatic collagenase decreased the serum and plasma hexosamine level, increased the plasma and serum histamine levels, and increased the dialyzable peptides and amino acids in the plasma and serum. These data indicate and support the fact that the enzyme retained its enzymic activity during the time intervals that the blood was obtained from the animal. Further studies on the stability of pancreatic collagenase enzymic activity while in contact with blood (serum and plasma) are in progress.

Subcutaneous injection of pancreatic collagenase into rats with granuloma pouch appeared to be complex in nature. The serum hexosamine level increased while the plasma hexosamine level decreased. These data might indicate that the action of pancreatic collagenase is on plasma mucoprotein components.

Carrying skin transplantation studies, special emphasis was done on the sex of the animal so as to prevent complications that might be induced by variations in the androgenic and estrogenic hormones. Male donors gave only to male recipients and female donors gave only to female recipients. The age of the animals was also emphasized. Twenty-one day old rats (100 gm. body weight) were used because the rate of connective tissue regeneration, wound healing and skin transplant resorption takes place at a greater accelerated rate in young animals; thus more reproducible data are obtained. Aseptic conditions were used to prevent bacterial infection of both the wound and the graft, and any infected animals have been discarded completely from these studies. The data described and the observations made during these studies indicate the influence of sex, age and bacterial infection.

The data described in these studies are related to only one dose level of pancreatic collagenase when injected directly after the operation. The effect of dose level on the skin transplant and wound tissue is under progress and will be described later.

A specific example of the mode of preparation of pancreatic collagenase may be set out as follows:

*Example 1*

Fresh porcine pancreas (50 lbs.) was packed in Dry Ice directly after removal from the animals and brought to the plant. The glands and the Dry Ice were ground in a Fitzmill and allowed to stand at 0° C. for 16 hours to evaporate all the Dry Ice. The powder was extracted with 10 parts of alcohol-Skelly B (3:1) for 2 hours and filtered. The filtrate was discarded and the residue re-extracted once more with 5 parts alcohol-Skelly B (3:1) for 2 hours and filtered. (Skelly B is petroleum ether with boiling range: All distills between 60–71° C. sp. gr. (25°/25° C.): 0.673–0.679".) The filtrate was discarded and the residue was extracted with 10 parts of acetone for 3 hours and filtered. The acetone filtrate was discarded and the residue was re-extracted a second time with 5 parts of ice cold acetone for 3 hours and filtered. The filtrate was discarded and the residue was dried at 0° C. in open trays for 72 hours to remove the acetone. The total yield obtained was 3382 gms. of white defatted pancreas powder.

The defatted pancreas powder (1127.3 gms.) was extracted with normal saline (11,280 ml.) for 5 hours at 0° C. The mixture was centrifuged and the supernatant filtered. The filtrate was the first extract (9400 ml.). The residue obtained on the centrifuge was re-extracted with normal saline (6000 ml.) for 3 hours and centrifuged. The residue was used to isolate the nucleic acids. The supernatant was the second extract (5800 ml.).

To the first extract enough solid ammonium sulfate was added slowly with mild continuous stirring to 50% saturation, then allowed to settle and centrifuged. The residue was dissolved in distilled water, dialyzed for 24 hours and concentrated tenfold by lyophilization (extract A). To the supernatant fluid, enough ammonium sulfate was added to 60% saturation and centrifuged. The supernatant fluid was discarded while the residue was dissolved in distilled water and dialyzed for 48 hours at 0° C. (extract B).

To the second extract enough solid ammonium sulfate was added slowly with mild continuous stirring to 60% saturation, then allowed to settle and centrifuged. The supernatant was discarded. The residue was dissolved in distilled water and dialyzed for 48 hours (extract C).

The concentrated pancreas solutions A, B and C were pooled together (total volume 1728 ml.).

Calcium phosphate (432 gms.) was equilibrated with phosphate buffer, 0.005 M at pH 7.6 (2160 ml.) for 48 hours.

To the concentrated pancreas solution, the equilibrated calcium phosphate was added slowly with mild continuous stirring, then distilled water (6480 ml.) was added. The mixture was stirred for 3 hours at 25° C. and filtered. The filtrate (9850 ml.) was concentrated on the lyophilizer, dialyzed exhaustively against large volumes of distilled water and lyophilized to dryness. This dry powder is to be used for the isolation and purification of glycine peptidase (yield 74 grams).

The residue from filtration was washed twice with 2000 ml. of 0.005 M phosphate buffer. The washings were discarded.

The collagenase was eluated from the washed residue by 10% ammonium sulfate (4000 ml.) by stirring the residue into the 10% ammonium sulfate for 4 hours, then filtered to obtain the first eluate (4310 ml.). The residue was stirred for a second time with 10% ammonium sulfate (1000 ml.) for 2½ hours and filtered to obtain the second eluate (1060 ml.). The residue was re-extracted for a third time with 10% ammonium sulfate and filtered to obtain the third eluate.

All three eluates were dialyzed against large volumes of distilled water for 72 hours, then lyophilized (yield 29.0 gms.).

Oral administration of collagenase, including bacterial collagenase, is found to be effective in the treatment of inflammatory conditions and diseases related to collagen synthesis and degradation.

While, in the foregoing specification, we have set forth procedure for treatment with enzymes and for the preparation of pancreatic collagenase in considerable detail for the purpose of illustrating one mode of the invention, it will be understood that such details may be varied widely by those skilled in the art without departing from the spirit of our invention.

We claim:

1. In a process for the preparation of pancreatic collagenase, the steps of defatting porcine pancreas, drying the residue to powder, extracting the powder with saline solution, adsorbing the collagenase in the solution extract onto calcium phosphate gel, and eluting the adsorbed material therefrom.

2. The process of claim 1 in which the collagenase is adsorbed onto calcium phosphate gel and is eluted with ammonium sulfate.

3. In a process of preparing pancreatic collagenase, the steps of: extracting defatted mammalian pancreas material with saline solution to create an extract; fractionating said extract with ammonium sulfate of about 60% saturation to form a collagenase-containing precipitate; dissolving said collagenase-containing precipitate in a pyrogen-free aqueous solvent to form a solution; adding at a physiologically acceptable pH for adsorption thereupon said solution to calcium phosphate gel; and eluting said adsorbed collagenase from said calcium phosphate gel.

4. The process of claim 3 in which said collagenase is eluted from said calcium phosphate gel with ammonium sulfate.

5. The process of claim 3 in which said extract is first fractionated with ammonium sulfate of up to 50% saturation and then fractionated with ammonium sulfate of about 60% saturation.

6. The process of claim 3 in which said calcium phosphate gel is equilibrated prior to use.

7. In a process for the preparation of pancreatic collagenase, the steps of extracting defatted mammalian pancreas material with saline solution at a temperature beneath the denaturation temperature of collagenase but above the freezing temperature of said solution to form an extract; purifying said extract by successive fractionation with ammonium sulfate of increased saturation in the range of 25% to 75% saturation while substantially maintaining said temperature, one of said ammonium sulfate fractionations including ammonium sulfate of at least about 60% saturation, to form a collagenase-containing precipitate; dissolving said precipitate in a pyrogen-free aqueous solvent to form a solution; adding at a physiologically acceptable pH said solution to calcium phosphate gel while still maintaining said temperature to adsorb collagenase on said gel; and eluting said adsorbed collagenase from said calcium phosphate gel.

8. Pancreatic collagenase characterized by its preparation from mammalian pancreas, its water solubility, its suitability for parenteral administration and its strong activity on purified corium collagen, on acid soluble steer hide collagen, CBZ-glycyl-L-prolyl-glycyl-L-propyl-L-alanine, L-prolyl-glycine, glycyl-L-prolyl-glycyl glycine, L-hydroxy-prolyl-glycine and L-hydroxy-prolyl-L-alanine, by its weaker activity on glycyl-tryosine amide, acetyl-L-tyrosine ethyl ester (maximum activity 75 units/mg.) benzoyl arginine ethyl ester (maximum activity 45 units/mg.); and no activity on N-CBZ-glycyl-L-proline and glycyl-proline.

References Cited by the Examiner

UNITED STATES PATENTS

| 2,801,956 | 8/1957 | Baumgarten et al. | 195—66 |
| 2,871,165 | 1/1959 | Robbins et al. | 195—63 |
| 2,893,920 | 7/1959 | Grant et al. | 195—62 |
| 2,989,440 | 6/1961 | Singher et al. | 195—66 |
| 2,994,640 | 8/1961 | Zellner | 167—65 |
| 3,073,743 | 1/1963 | Spero | 167—65 |

FOREIGN PATENTS

| 1,084,874 | 7/1960 | Germany. |

OTHER REFERENCES

Mandl, Advances in Enzymology, 1961, pages 163–264 (pp. 171, 172, 188–190, 220–221, 229–230, relied on).

Chemical Abstracts (1), 47:6689e (1953).
Chemical Abstracts (2), 45:8281h (1951).
Chemical Abstracts (3), 45:8054f (1951).

Seifter et al.: Journal of Biological Chemistry (February 1959), vol. 234, pp. 285–293.

Houck et al.: Proceedings Society Experimental Medicine and Biology 1959, vol. 102, pages 421–423.

A. LOUIS MONACELL, *Primary Examiner.*

FRANK CACCIAPAGLIA, WILLIAM B. KNIGHT,
*Examiners.*

L. M. SHAPIRO, *Assistant Examiner.*